United States Patent
Cortes Salazar

(10) Patent No.: US 10,870,773 B2
(45) Date of Patent: Dec. 22, 2020

(54) INKJET INK SET FOR PREPARING CONDUCTIVE LAYERS OR PATTERNS

(71) Applicant: AGFA-GEVAERT NV, Mortsel (BE)

(72) Inventor: Fernando Cortes Salazar, Mortsel (BE)

(73) Assignee: AGFA-GEVAERT NV, Mortsel (BE)

( * ) Notice: Subject to any disclaimer, the term of this patent is extended or adjusted under 35 U.S.C. 154(b) by 0 days.

(21) Appl. No.: 16/306,975

(22) PCT Filed: Jun. 7, 2017

(86) PCT No.: PCT/EP2017/063756
§ 371 (c)(1),
(2) Date: Dec. 4, 2018

(87) PCT Pub. No.: WO2017/211853
PCT Pub. Date: Dec. 14, 2017

(65) Prior Publication Data
US 2019/0144698 A1    May 16, 2019

(30) Foreign Application Priority Data

Jun. 8, 2016 (EP) .................................... 16173509

(51) Int. Cl.

| | | |
|---|---|---|
| C09D 11/52 | (2014.01) | |
| C09D 11/322 | (2014.01) | |
| C09D 11/326 | (2014.01) | |
| B41J 2/165 | (2006.01) | |
| B41J 11/00 | (2006.01) | |
| B41M 5/00 | (2006.01) | |
| C09D 11/033 | (2014.01) | |
| C09D 11/037 | (2014.01) | |
| C09D 11/36 | (2014.01) | |
| C09D 11/40 | (2014.01) | |

(52) U.S. Cl.
CPC ............. *C09D 11/52* (2013.01); *B41J 2/1652* (2013.01); *B41J 11/002* (2013.01); *B41M 5/0023* (2013.01); *C09D 11/033* (2013.01); *C09D 11/037* (2013.01); *C09D 11/322* (2013.01); *C09D 11/326* (2013.01); *C09D 11/36* (2013.01); *C09D 11/40* (2013.01)

(58) Field of Classification Search
CPC ..... C09D 11/52; C09D 11/322; C09D 11/326; B22F 1/0022; B22F 9/24
USPC ..................................................... 347/95, 100
See application file for complete search history.

(56) References Cited

U.S. PATENT DOCUMENTS

| | | | | |
|---|---|---|---|---|
| 9,275,773 | B2 * | 3/2016 | Andre | .................... C09D 11/03 |
| 9,839,961 | B2 * | 12/2017 | Loccufier | ................ C09D 1/00 |
| 2011/0240905 | A1 | 10/2011 | Funakubo et al. | |
| 2015/0017405 | A1 | 1/2015 | André et al. | |
| 2016/0108272 | A1 | 4/2016 | Bollen et al. | |
| 2019/0169457 | A1 * | 6/2019 | Van Der Meulen | ........................ C09D 11/103 |

FOREIGN PATENT DOCUMENTS

| | | |
|---|---|---|
| EP | 2 671 927 A1 | 12/2013 |
| JP | 2010-150326 A | 7/2010 |
| JP | 2011-221149 A | 11/2011 |
| JP | 2012-082116 A | 4/2012 |
| JP | 2015-229696 A | 12/2015 |
| WO | 2015/000932 A1 | 1/2015 |
| WO | 2016/102192 A1 | 6/2016 |

OTHER PUBLICATIONS

Official Communication issued in International Patent Application No. PCT/EP2017/063756, dated Jul. 6, 2017.
Official Communication issued in Japanese Patent Application No. 2018-564376, dated Nov. 20, 2019.

* cited by examiner

*Primary Examiner* — An H Do
(74) *Attorney, Agent, or Firm* — Stinson LLP

(57) ABSTRACT

An inkjet ink set includes a silver inkjet ink and a flushing liquid, characterized in that the flushing liquid includes at least 25 wt % of 2-phenoxy ethanol based on the total weight of the flushing liquid.

7 Claims, No Drawings

INKJET INK SET FOR PREPARING CONDUCTIVE LAYERS OR PATTERNS

CROSS REFERENCE TO RELATED APPLICATIONS

This application is a 371 National Stage Application of PCT/EP2017/063756, filed Jun. 7, 2017. This application claims the benefit of European Application No. 16173509.7, filed Jun. 8, 2016, which is incorporated by reference herein in its entirety.

BACKGROUND OF THE INVENTION

1. Field of the Invention

The present invention relates to an inkjet ink set for preparing conductive layers or patterns, in particular conductive silver layers or patterns.

The invention also relates to a method of preparing the conductive layers or patterns at moderate curing conditions.

2. Description of the Related Art

The interest in metallic printing or coating fluids comprising metallic nanoparticles has increased during the last decades due to their unique properties when compared to the bulk properties of a given metal. For example, the melting point of metallic nanoparticles decreases with decreasing particle size making them of interest for printed electronics, electrochemical, optical, magnetic and biological applications.

The production of stable and concentrated metallic printing or coating fluids which can be printed, for example by inkjet printing, or coated at high speed is of great interest as it enables the preparation of electronic devices at low costs.

Metallic printing or coating fluids are typically a metallic nanoparticle dispersion comprising metallic nanoparticles and a dispersion medium. Such metallic nanoparticle dispersions can be directly used as a printing or coating fluid. However, additional ingredients are often added to the metallic nanoparticle dispersion to optimize the properties of the resulting metallic printing or coating fluids.

Typically, after applying the metallic printing or coating fluids on a substrate, a sintering step, also referred to as curing step, at elevated temperatures is carried out to induce/enhance the conductivity of the applied patterns of layers. The organic components of the metallic printing or coating fluids, for example the polymeric dispersants, may reduce the sintering efficiency and thus the conductivity of the applied patterns of layers. For this reason, higher sintering temperatures and longer sintering times are often required to decompose the organic components.

EP-A 2671927 discloses a metallic nanoparticle dispersion, for example a silver inkjet ink, comprising a specific dispersion medium, for example 2-pyrrolidone, resulting in a more stable dispersion without using a polymeric dispersant.

Unpublished EP-A 14199745.2 (filed 22 Dec. 2014) discloses a metallic nanoparticle dispersion comprising silver nanoparticles, a liquid carrier and specific dispersion stabilizing compounds.

A problem often encountered when using a silver inkjet ink is so-called clogging of the inkjet printheads. Such clogging of the inkjet printheads may result in printing defects and may shorten the lifetime of the printhead.

It is known to use so-called "flushing" or "washing" liquids for unclogging inkjet nozzles and cleaning the nozzle plate of the print head, as well as all the tubing and connections between the ink tank to the printhead. Such flushing liquids typically comprise of a solvent or a solvent mixture able to remove efficiently all inkjet ink residues without affecting the stability of the printhead. Additionally, the flushing solution must be also compatible in all its proportions with the employed inkjet ink.

SUMMARY OF THE INVENTION

Preferred embodiments of the present invention provide an inkjet ink set for preparing conductive layers or patterns, in particular conductive silver layers or patterns, whereby no or a minimal amount of printing defects are observed and whereby the lifetime of the inkjet printheads is improved.

These advantages and benefits are realized by an inkjet ink set including a silver inkjet ink and a flushing liquid as defined below.

The invention also relates to a method of preparing the conductive layers or patterns at moderate curing conditions using the inkjet ink set.

Further advantages and embodiments of the present invention will become apparent from the following description.

DETAILED DESCRIPTION OF THE PREFERRED EMBODIMENTS

Definitions

The terms polymeric support and foil, as used herein, mean a self-supporting polymer-based sheet, which may be associated with one or more adhesion layers, e.g. subbing layers. Supports and foils are usually manufactured through extrusion.

The term layer as used herein, is considered not to be self-supporting and is manufactured by coating or spraying it on a (polymeric) support or foil.

PET is an abbreviation for polyethylene terephthalate.

The term alkyl means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl group or a naphthyl group including one, two, three or more $C_1$ to $C_6$-alkyl groups.

Unless otherwise specified a substituted or unsubstituted alkaryl group is preferably a $C_1$ to $C_6$-alkyl group including an aryl group, preferably a phenyl group or naphthyl group.

Unless otherwise specified a substituted or unsubstituted aryl group is preferably a substituted or unsubstituted phenyl group or naphthyl group.

A cyclic group includes at least one ring structure and may be a monocyclic- or polycyclic group, meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulphur atoms, selenium atoms or combinations thereof.

An alicyclic group is a non-aromatic homocyclic group wherein the ring atoms consist of carbon atoms.

The term heteroaryl group means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms.

The term substituted, in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl, a substituted heteroaryl and a substituted heterocyclic group are preferably substituted by one or more substituents selected from the group consisting of methyl, ethyl, n-propyl, isopropyl, n-butyl, 1-isobutyl, 2-isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Inkjet Ink Set.

The inkjet ink set includes a silver inkjet ink and a flushing liquid, wherein the flushing liquid comprises at least 25 wt % of 2-phenoxy ethanol based on the total weight of the flushing liquid.

Flushing Liquid

The flushing liquid comprises at least 25 wt %, preferably at least 40 wt %, more preferably at least 50 wt % of 2-phenoxy ethanol based on the total weight of the flushing liquid.

The flushing liquid may comprise another solvent, preferably a high boiling solvent.

High boiling organic solvents referred to herein are solvents which have a boiling point that is higher than the boiling point of water (>100° C.)

Preferred high boiling solvents are shown in Table 1.

TABLE 1

| Chemical formula | Chemical name | Bp (° C.) |
|---|---|---|
|  | 4-methyl-1,3-dioxolan-2-one (propylene carbonate) | 242 |

TABLE 1-continued

| Chemical formula | Chemical name | Bp (° C.) |
|---|---|---|
|  | n-butanol | 117 |
|  | 1,2-propanediol | 211-217 |
|  | 4-hydroxy-4-methylpentan-2-one (diaceton alcohol) | 168 |
|  | Pentan-3-one (diethyl ketone) | 102 |
|  | 2-Butoxyethanol Ethylene glycol monobutyl ether | 171 |
|  | Dihydrofuran-2(3H)-one (Gamma-butyrolacton) | 204 |
|  | 2-pyrrolidon | 245 |
|  | 1-methoxy-2-propanol (propyleneglycolmonomethylether | 120 |

The flushing liquid preferably comprises at least 25 wt % of 2-phenoxyethanol and a further solvent selected from the group consisting of propylene carbonate, n-butanol and 2-pyrrolidone.

A particularly preferred flushing liquid comprised at least 25 wt % of 2-phenoxy ethanol and from 5 wt % to 20 wt % of n-butanol, all based on the total weight of the Flushing liquid.

The viscosity at 25° C. of the flushing liquid preferably is preferably lower than 20 mPa·s, more preferably less than 15, most preferably less than 10 mPa·s.

Silver Inkjet Ink

The silver inkjet ink preferably comprises silver nanoparticles, a liquid carrier and a dispersion-stabilizing compound (DSC).

The silver inkjet ink may further comprise a polymeric dispersant and additives to further optimize its properties.

Dispersion-Stabilizing Compound (DSC)

The silver inkjet ink preferably comprises silver nanoparticles, a liquid carrier and a dispersion-stabilizing compound (DSC) according to Formulae I, II, III or IV,

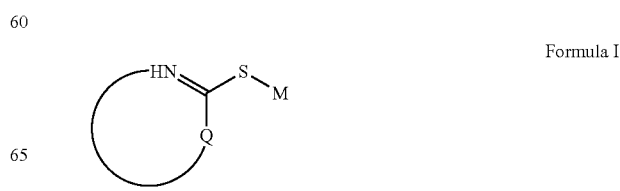

Formula I

-continued

Formula II

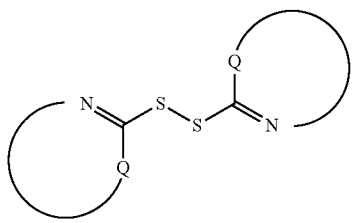

Formula III

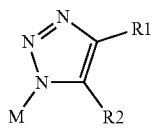

Formula IV

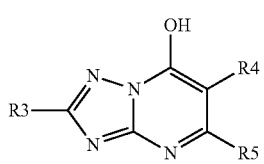

wherein

Q represents the necessary atoms to form a substituted or unsubstituted five or six membered heteroaromatic ring;

M is selected from the group consisting of a hydrogen, a monovalent cationic group and an acyl group;

R1 and R2 are independently selected from the group consisting of a hydrogen, a substituted or unsubstituted alkyl group, a substituted or unsubstituted alkenyl group, a substituted or unsubstituted alkynyl group, a substitued or unsubstituted alkaryl group, a substituted or unsubstituted aralkyl group, a substituted or unsubstituted aryl or heteroaryl group, a hydroxyl group, a thioether, an ether, an ester, an amide, an amine, a halogen, a ketone and an aldehyde;

R1 and R2 may represent the necessary atoms to form a five to seven membered ring;

R3 to R5 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group, a hydroxyl group, a thiol, a thioether, a sulfone, a sulfoxide, an ether, an ester, an amide, an amine, a halogen, a ketone, an aldehyde, a nitrile and a nitro group;

R4 and R5 may represent the necessary atoms to form a five to seven membered ring.

The dispersion-stabilizing compound is preferably a compound according to Formula I.

The dispersion-stabilizing compound is more preferably a compound according to Formula I, wherein Q represents the necessary atoms to form a five membered heteroaromatic ring.

A particular preferred dispersion-stabilizing compound is a compound according Formula I, wherein Q is a five membered heteroaromatic ring selected from the group consisting of an imidazole, a benzimidazole, a triazole, a benzothiazole, an oxazole, a benzoxazole, a 1,2,3-triazole, a 1,2,4-triazole, an oxadiazole, a thiadiazole and a tetrazole.

Some examples of dispersion-stabilizing compounds according to the present invention are shown in the following table.

| DSC | Chemical Formula |
|---|---|
| DCS-01 | ![structure] |
| DCS-02 | ![structure] |
| DCS-03 | ![structure] |
| DCS-04 | ![structure] |
| DCS-05 | ![structure] |
| DCS-06 | ![structure] |
| DCS-07 | ![structure] |
| DCS-08 | ![structure] |

-continued

| DSC | Chemical Formula |
|---|---|
| DCS-09 | (structure) |
| DCS-10 | (structure) |
| DCS-11 | (structure) |
| DCS-12 | (structure) |
| DCS-13 | (structure) |
| DCS-14 | (structure) |
| DCS-15 | (structure) |

-continued

| DSC | Chemical Formula |
|---|---|
| DCS-16 | (structure) |

The dispersion-stabilizing compound is preferably selected from the group consisting of N,N-dibutyl-(2,5-dihydro-5-thioxo-1H-tetrazol-1-yl-acetamide, 5-heptyl-2-mercapto-1,3,4-oxadiazole, 1-phenyl-5-mercaptotetrazol, 5-methyl-1,2,4-triazolo-(1,5-a) primidine-7-ol, and S-[5-[(ethoxycarbonyl)amino]-1,3,4-thiadiazol-2-yl] O-ethyl thiocarbonate.

The dispersion-stabilizing compounds according to Formula I to IV are preferably non-polymeric compounds. Non-polymeric compounds as used herein means compounds having a Molecular Weight which is less preferably than 1000, more preferably less than 500, most preferably less than 350.

The amount of the dispersion-stabilizing compounds (DSC) expressed as wt % relative to the total weight of silver (Ag) in the silver inkjet ink is preferably between 0.005 and 10.0, more preferably between 0.0075 and 5.0, most preferably between 0.01 and 2.5. When the amount of the dispersion-stabilizing compound relative to the total weight of silver is too low, the stabilizing effect may be too low, while a too high amount of the dispersion-stabilizing compound may adversely affect the conductivity of the coating or patterns obtained with the silver inkjet ink.

Silver Nanoparticles

The dispersed silver nanoparticles have an average particle size or average particle diameter, measured with Transmission Electron Microscopy, of less than 150 nm, preferably less than 100 nm, more preferably less than 50 nm, most preferably less than 30 nm.

The amount of silver nanoparticles in the inkjet is preferably at least 5 wt %, more preferably at least 10 wt %, most preferably at least 15 wt %, particularly preferred at least 20 wt %, relative to the total weight of the silver inkjet ink.

The silver nanoparticles are preferably prepared by the method disclosed in EP-A 2671927, paragraphs [0044] to and the examples.

Polymeric Dispersant

The silver inkjet ink may contain a polymeric dispersant.

Polymeric dispersants typically contain in one part of the molecule so-called anchor groups, which adsorb onto the silver particles to be dispersed. In another part of the molecule, polymeric dispersants have polymer chains compatible with the dispersion medium, also referred to as liquid vehicle, and all the ingredients present in the final printing or coating fluids.

Polymeric dispersants are typically homo- or copolymers prepared from acrylic acid, methacrylic acid, vinyl pyrrolidinone, vinyl butyral, vinyl acetate or vinyl alcohol monomers.

The polymeric dispersants disclosed in EP-A 2468827, having a 95 wt % decomposition at a temperature below 300° C. as measured by Thermal Gravimetric Analysis may also be used.

However, in a preferred embodiment the silver inkjet ink comprises less than 5 wt % of a polymeric dispersant relative to the total weight of the dispersion, more preferably less than 1 wt %, most preferably less than 0.1 wt %. In a particularly preferred embodiment the dispersion comprises no polymeric dispersant at all.

Liquid Carrier

The silver inkjet ink comprises a liquid carrier.

The liquid carrier is preferably an organic solvent. The organic solvent may be selected from alcohols, aromatic hydrocarbons, ketones, esters, aliphatic hydrocarbons, higher fatty acids, carbitols, cellosolves, and higher fatty acid esters.

Suitable alcohols include methanol, ethanol, propanol, 1-butanol, 1-pentanol, 2-butanol, t-butanol.

Suitable aromatic hydrocarbons include toluene and xylene.

Suitable ketones include methyl ethyl ketone, methyl isobutyl ketone, 2,4-pentanedione and hexa-fluoroacetone.

Also glycol, glycolethers, N,N-dimethyl-acetamide, N,N-dimethylformamide may be used.

A mixture of organic solvents may be used to optimize the properties of the metallic nanoparticle dispersion.

Preferred organic solvents are high boiling solvents. High boiling organic solvents referred to herein are solvents which have a boiling point that is higher than the boiling point of water (>100° C.)

Preferred high boiling solvents are shown in Table 2.

TABLE 2

| Chemical formula | Chemical name | Bp (° C.) |
|---|---|---|
| | 2-phenoxy ethanol (ethylene glycol monophenylether) | 247 |
| | 4-methyl-1,3-dioxolan-2-one (propylene carbonate) | 242 |
| | n-butanol | 117 |
| | 1,2-propanediol | 211-217 |
| | 4-hydroxy-4-methylpentan-2-one (diaceton alcohol) | 168 |
| | Pentan-3-one (diethyl ketone) | 102 |
| | 2-Butoxyethanol Ethylene glycol monobutyl ether | 171 |

TABLE 2-continued

| Chemical formula | Chemical name | Bp (° C.) |
|---|---|---|
| | Dihydrofuran-2(3H)-one (Gamma-butyrolacton) | 204 |
| | 2-pyrrolidon | 245 |
| | 1-methoxy-2-propanol (propyleneglycolmonomethylether | 120 |

Particularly preferred high boiling solvents are 2-phenoxy ethanol, propylene carbonate, propylene glycol, n-butanol, 2-pyrrolidone and mixtures thereof.

The silver ink preferably comprises at least 25 wt % of 2-phenoxyethanol, more preferably at least 40 wt %, based on the total weight of the silver ink.

Additives

To optimize the printing properties, and also depending on the application for which it is used, additives such as reducing agents, wetting/levelling agents, dewettting agents, rheology modifiers, adhesion agents, tackifiers, humectants, jetting agents, curing agents, biocides or antioxidants may be added to the silver inkjet ink described above.

The silver inkjet ink may comprise a surfactant. Preferred surfactants are Byk® 410 and 411, both solutions of a modified urea, and Byk® 430, a solution of a high molecular urea modified medium polar polyamide.

The amount of the surfactants is preferably between 0.01 and 10 wt %, more preferably between 0.05 and 5 wt %, most preferably between 0.1 and 0.5 wt %, relative to the total amount of the metallic nanoparticle dispersion.

It may be advantageous to add a small amount of a metal of an inorganic acid or a compound capable of generating such an acid during curing of a metallic layer or pattern formed from the silver inkjet ink such as disclosed in EP-A 2821164. Higher conductivities and/or lower curing temperatures were observed of layers or patterns formed from such silver inkjet ink.

Higher conductivities and/or lower curing temperatures may also be obtained when using silver inkjet ink containing a compound according to Formula X, as disclosed in EP-A 3016763.

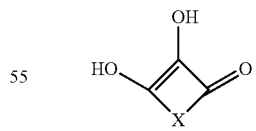

Formula X wherein

X represents the necessary atoms to form a substituted or unsubstituted ring.

A particularly preferred compound according to Formula X is an ascorbic or erythorbic acid derivative compound.

Preparation of the Silver Inkjet Ink

The preparation of the silver inkjet ink according to the present invention typically comprises the addition of the liquid carrier, the dispersion-stabilizing compound and optional additives to the silver nanoparticles by using a homogenization technique such as stirring, high shear mixing, ultra-sonication, or a combination thereof.

The silver nanoparticles from which the silver inkjet ink is made is typically a paste or a highly concentrated dispersion of silver nanoparticles. A preferred preparation method of the metallic nanoparticles is disclosed in EP-A 2671927.

It has been observed that better results are obtained when all, or a portion, of the dispersion-stabilizing compound are added during the preparation method of the silver nanoparticles. Due to their adsorption to the silver nanoparticles, the dispersion-stabilizing compounds added during the preparation of the silver nanoparticles will be retained, at least partially, in the final silver nanoparticle dispersion, even if one or more washing steps have been carried out in the preparation method.

The homogenization step can be carried out at elevated temperature up to 100° C. In a preferred embodiment, the homogenization step is carried out at temperature equal or below 60° C.

Silver Layers or Patterns

Silver layers or patterns may be printed with the silver inkjet ink.

Conductive silver layers or patterns are prepared by an inkjet printing method comprising the steps of jetting the silver inkjet ink on a support followed by a curing step. Such a curing step is also referred to as a sintering step.

The support may be a glass, a paper or a polymeric support.

Preferred polymeric supports are polycarbonate, polyethylene terephthalate (PET) or polyvinylchloride (PVC) based supports.

The above mentioned supports may be provided with one or more layers to improve the adhesion, absorption or spreading of the applied conductive inkjet inks.

Polymeric supports are preferably provided with so-called subbing layers to improve the adhesion of the applied conductive inkjet or flexo inks. Such subbing layers are typically based on vinylidene copolymers, polyesters, or (meth)acrylates.

Useful subbing layers for this purpose are well known in the art and include, for example, polymers of vinylidene chloride such as vinylidene chloride/acrylonitrile/acrylic acid terpolymers or vinylidene chloride/methyl acrylate/itaconic acid terpolymers.

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

Other preferred subbing layers include a binder based on a polyester-urethane copolymer. In a more preferred embodiment, the polyester-urethane copolymer is an ionomer type polyester urethane, preferably using polyester segments based on terephthalic acid and ethylene glycol and hexamethylene diisocyanate. A suitable polyester-urethane copolymer is Hydran™ APX101 H from DIC Europe GmbH.

The application of subbing layers is well-known in the art of manufacturing polyester supports for silver halide photographic films. For example, the preparation of such subbing layers is disclosed in U.S. Pat. No. 3,649,336 and GB 1441591.

In a preferred embodiment, the subbing layer has a dry thickness of no more than 0.2 µm or preferably no more than 200 mg/m$^2$.

Another preferred support is an ITO based support. Such a support is typically a glass or polymer support whereupon an ITO layer or pattern is provided.

A preferred paper based support is the Powercoat® paper substrate, a substrate designed for printed electronics by Arjowiggins Creative Papers.

Multiple silver layers or patterns, i.e. a stack of patterned or unpatterned layers, may be applied on a substrate. The support referred to in the method of preparing the silver layers or patterns thus also encompass a previously applied silver layer or pattern.

An inkjet printing method of preparing a conductive layer or pattern comprising the steps of:
 cleaning the print head with a flushing liquid as described above prior to load the Ag inkjet ink,
 jetting a silver inkjet ink with an inkjet printer comprising a print head on a support thereby forming a silver layer or pattern on the support;
 curing the silver layer or pattern thereby forming a conductive layer or pattern; and
 cleaning the print head with a flushing liquid as described above.

The silver inkjet ink is preferably as described above.

In a preferred inkjet printing method the curing temperature is below 150° C. and the curing time is less than 30 minutes.

Inkjet Printing Devices

Various embodiments of an apparatus for creating silver layers or pattern from the silver inkjet inks according to the present invention by inkjet printing may be used.

In a flat bed printing device a support is provided on a flat bed. Droplets of a silver inkjet fluid are jetted from a print head on the support.

The print heads typically scan back and forth in a transversal direction (x-direction) across a moving support (y-direction). Such bi-directional printing is referred to as multi-pass printing.

Another preferred printing method is the so-called single-pass printing method wherein the print heads, or multiple staggered print heads, cover the entire width of the support. In such a single-pass printing method, the print heads usually remain stationary while the support is transported under the print heads (y-direction).

To obtain maximal dot placement accuracy, the print heads are positioned as close as possible to the surface of the support. The distance between the print heads and the surface of the support is preferably less than 3 mm, more preferably less than 2 mm, most preferably less than 1 mm.

As the distance between the printhead and the surface of the support may influence the dot placement accuracy, it may be advantageous to measure the thickness of a support and adapting the distance between the printhead and the surface of the support based on the measurement of the thickness of the support.

The distance between a stationary printhead and the surface of a support mounted on the printing device may also vary over the whole support, due to for example waviness of the support, or other irregularities in the surface of the support. Therefore it may also be advantageous to measure the surface topography of the support and to compensate the differences in the measured surface topography by controlling the so-called firing time of the droplets of curable fluids on the support, or by adjusting the distance between the printhead and the surface of the support. Examples of measurement devices to measure the surface topography of a lithographic supports is disclosed in ISO 12635:2008(E).

In a preferred embodiment the inkjet printing device has holding down means, such as a vacuum chamber under the support, to hold down the support in a so-called hold-down zone, for example by vacuum. In a more preferred embodiment the support is hold down against the support by independent working holding down means such as a plurality of vacuum chambers under the support which are independently controlled to enhance the vacuum pressure on the support so that more than one hold down zones are generated on the support. The holding down of the support enhances the drop placement of the jetted droplets and position accuracy.

Print Head

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as the continuous printing type.

Preferred print heads eject droplets having a volume ≤50 pL, more preferably ≤35 pL, most preferably ≤25 pL, particularly preferred ≤15 pL.

Another preferred print head is a throughflow piezoelectric inkjet print head. A throughflow piezoelectric inkjet print head is a print head wherein a continuous flow of liquid is circulating through the liquid channels of the print head to avoid agglomerations in the liquid which may cause disturbing effects in the flow and bad drop placements. Avoiding bad drop placements by using throughflow piezoelectric inkjet print heads may improve the quality of the conductive patterns on the support. Another advantage of using such throughflow print heads is a higher viscosity limit of the curable fluids to be jetted, widening the scope of compositional variations of the fluids.

Curing Step

After the layers or patterns are applied on the support, a sintering step, also referred to as curing step, is carried out. During this sintering step, solvents evaporate and the silver particles sinter together. Once a continuous percolating network is formed between the metallic particles, the layers or patterns become conductive. Conventional curing is typically carried out by applying heat. The curing temperature and time are dependent on the support used and on the composition of the metallic layer or pattern. The curing step for curing the silver layers may be performed at a temperature below 200° C., preferably below 180° C., more preferably below 150° C., most preferably below 130° C.

The curing time may be less than 60 minutes, preferably between 2 and 30 minutes and more preferably between 3 and 20 minutes, depending on the selected temperature, support and composition of the metallic layers.

However, instead of or in addition to the conventional sintering by applying heat, alternative sintering methods such as exposure to an Argon laser, to microwave radiation, to UV radiation or to low pressure Argon plasma, photonic curing, plasma or plasma enhanced, electron beam, laser beam or pulse electric current sintering may be used.

Another curing method uses the so-called Near infrared (NIR) curing technology. The metal of the coating or the pattern, for example silver, may act as absorber for the NIR radiation.

The silver layers of the present invention allow to use lower curing temperatures than the prior art processes. In consequence it is possible to use polymeric substrates that can not withstand thermal treatment at high temperature, such as for example PET. The curing time may also be substantially reduced leading to the possibility of having higher production per hour than the prior art processes. The conductivity of the silver layers are maintained or even improved in certain cases.

To further increase the conductivity or to lower the curing temperature it may be advantageous to contact the silver layer or pattern with a solution containing an acid or an acid precursor capable or releasing the acid during curing of the metallic layer or pattern, as disclosed in EP-A 13175030.9 (filed on Apr. 7, 2013).

The silver layers or patterns may be used in various electronic devices or parts of such electronic devices as for example organic photo-voltaics (OPV's), inorganic photo-voltaics (c-Si, a-Si, CdTe, CIGS), OLED displays, OLED lighting, inorganic lighting, RFID's, organic transistors, thin film batteries, touch-screens, e-paper, LCD's, plasma, sensors, membrane switches or electromagnetic shielding.

Additionally, the silver layers or patterns may be used in various security or decorative devices or parts of such security or decorative devices, for example when an image with special features that will impede its complete or partial reproduction or a light reflective layer with metal appearance is required.

EXAMPLES

Materials

All materials used in the following examples were readily available from standard sources such as ALDRICH CHEMICAL Co. (Belgium) and ACROS (Belgium) unless otherwise specified. The water used was deionized water.

DSC-01 is the dispersion-stabilizing compound N-dibutyl-(2,5-dihydro-5-thioxo-1H-tetrazol-1-yl)acetamide (CASRN168612-06-4) commercially available from Chemosyntha.

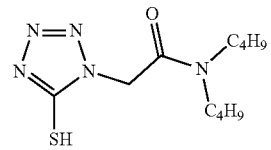

Silver oxide, $Ag_2O$ commercially available from UMICORE.

2-phenoxy-ethanol (CASRN122-99-6) commercially available from BASF.

Gamma-butyro-lactone (CASRN96-48-0) commercially available from BASF.

Propylenecarbonate (CASRN108-32-7) commercially available from Sigma Aldrich.

Diaceton alcohol (CASRN123-42-2) commercially available from ACROS CHIMICA.

n-butanol (CASRN71-36-3) commercially available from ACROS CHIMICA.

1,2 propanediol (CASRN57-55-6) commercially available from ACROS CHIMICA.

1-methoxy-2-propanol (CASRN107-98-2) commercially available from DOW CHEMICALS.

2-butoxyethanol (CASRN111-76-2) commercially available from DOW CHEMICALS.

Copol (Vicl$_2$-MA-IA), a copolymer of vinylidenechloride-methacrylic acid and itaconic acid from Agfa Gevaert.

Mersolat H40, a surfactant from Lanxess.

Kieselsol 100F, a silica from Bayer.

Measurements Methods

Conductivity of the Silver Coatings

The surface resistance (SER) of the silver coatings was measured using a four-point collinear probe. The surface or sheet resistance was calculated by the following formula:

$$SER = (\pi/\ln 2) \ast (V/I)$$

wherein

SER is the surface resistance of the layer expressed in Ω/square;

π is a mathematical constant, approximately equal to 3.14;

ln 2 is a mathematical constant equal to the natural logarithmic of value 2, approximately equal to 0.693;

V is voltage measured by voltmeter of the four-point probe measurement device;

I is the source current measured by the four-point probe measurement device.

For each sample, six measurements were performed at different positions of the coating and the average value was calculated.

The silver content $M_{Ag}$ (g/m$^2$) of the coatings was determined by WD-XRF.

The conductivity of the coated layers was then determined by calculating the conductivity as a percentage of the bulk conductivity of silver using the following formula:

$$\% \ Ag_{(bulk)} = \frac{\sigma_{Coat}}{\sigma_{Ag}} \times 100$$

$$\% \ Ag_{(bulk)} = \frac{\rho_{Ag}}{\sigma_{Ag} \times SER \times M_{Ag}} \times 100$$

wherein $\sigma_{Ag}$ the specific conductivity of silver (equal to 6.3×10$^7$ S/m), $\sigma_{Coat}$ is the specific conductivity of the Ag coating and $\rho_{Ag}$ is the density of silver (1.049×10$^7$ g/m$^3$).

Measuring the Instability Index

The stability of a silver ink/flushing liquid mixture was measured using multiple light scattering coupled with a vertical scanning to monitor the dispersion state of the mixture. Acceleration of the sedimentation phenomena can be induced for example by fast centrifugation of the sample during the measurement.

A commercial available apparatus is for example a Lumisizer® from LUM GmbH. The samples were measured during 4 hours at 3000 rpm with 880 nm radiation. An instability index provided by the Lumisizer® ranges between 0 and 1, wherein the instability increases from 0 to 1.

Viscosity Measurements

Unless otherwise provided, viscosities were measured at 25° C. at a shear rate of 1000 s$^{-1}$ using a commercially available viscometer for example as a DHR-2 Rheometer (double wall ring) from TA Instruments.

Example 1

Preparation of the Silver Ink AgInk-01

450 g of silver oxide (commercially available from Umicore) was added to a mixture of 875 g of ethanol and 517 g of 2-pyrrolidone while stirring. The obtained predispersion was then further stirred at 23° C. for 15 hours.

Then, 2.8 g of DSC-01 was added to the mixture followed by the addition of 73 g of formic acid (10.0 mL/min) while stirring and keeping the temperature at 23° C. After the addition of the formic acid, the mixture was further stirred for another 15 hours at 23° C.

The dispersion was then concentrated by evaporation of the organic solvent to obtain a concentrated silver nanoparticle dispersion with a silver content of approximately 45 wt %.

The silver ink AgInk-01 were then prepared by mixing 44 wt % of the concentrated silver nanoparticle dispersion with 50 wt % of 2-phenoxyethanol, 6 wt % propylenecarbonate and 10 wt % n-butanol, all wt % based on the total weight of the silver ink.

Preparation of the Flushing Liquids Flush-01 to Flush-12

The flushing liquids Flush-01 to Flush-12 having a composition as shown in Table 3 have been prepared by mixing the different solvents at room temperature.

TABLE 3

| Ingredients (wt %) | Flush-01 | Flush-02 | Flush-03 | Flush-04 | Flush-05 | Flush-06 |
|---|---|---|---|---|---|---|
| 2-phenoxyethanol | 69 | 64 | 59 | 54 | 50 | 50 |
| Propylene carbonate | 21 | 16 | 11 | 6 | 50 | — |
| n-butanol | 10 | 20 | 30 | 40 | 0 | — |
| 2-pyrrolidone | — | — | — | — | — | 50 |
| ethanol | — | — | — | — | — | — |

| Ingredients | Flush-07 | Flush-08 | Flush-09 | Flush-10 | Flush-11 | Flush-12 |
|---|---|---|---|---|---|---|
| 2-phenoxyethanol | 50 | 100 | — | — | — | — |
| Propylene carbonate | 25 | — | 100 | — | — | — |
| n-butanol | — | — | — | 100 | — | — |
| 2-pyrrolidone | 25 | — | — | — | 100 | — |
| ethanol | — | — | — | — | — | 100 |

The viscosity of each prepared flushing (determined as described above and measured at 25° C. at a shear rate of 1000 s$^{-1}$) is presented in Table 4, as well as, the instability index (determined as described above) for a full series of Ag ink:flushing liquid mixtures. The instability index has been measured for several mixtures of the silver ink AgInk-01 and the flushing liquids Flush-01 to Flush-06 having a wt/wt ratio as shown in Table 4. In Table 4 the mixture 1:99 stands for a mixture comprising 1 wt % silver ink and 99 wt % flushing liquid, etc.

TABLE 4

| Flushing liquid | viscosity (mPa. s) | instability index | | | |
|---|---|---|---|---|---|
| | | 1:99 | 10:90 | 30:70 | 50:50 |
| Flush-01 | 7.3 | 0.09 | 0.13 | 0.08 | 0.09 |
| Flush-02 | 6.2 | — | 0.15 | 0.10 | 0.09 |
| Flush-03 | 5.4 | — | 0.22 | 0.17 | 0.12 |
| Flush-04 | 4.9 | 0.33 | 0.36 | 0.23 | 0.17 |
| Flush-05 | 5.0 | 0.92 | 0.18 | 0.25 | 0.30 |
| Flush-06 | 17.0 | 0.01 | 0.03 | 0.04 | 0.06 |
| Flush-07 | 9.4 | 0.03 | 0.13 | 0.17 | 0.24 |
| Flush-08 | 20.4 | 0.00 | 0.02 | 0.03 | 0.03 |
| Flush-09 | 2.6 | 1.00 | 1.00 | 0.64 | 0.61 |
| Flush-10 | 2.7 | 1.00 | 1.00 | 0.93 | 0.64 |
| Flush-11 | 13.3 | 1.00 | 0.08 | 0.08 | 0.015 |
| Flush-12 | 0.9 | 1.00 | 1.00 | 1.00 | 1.00 |

From the results of Table 4 it is clear that mixtures of the silver inkjet ink AgInk-01 and the flushing solutions, which do not contain at least 25 wt % of 2-phenoxy ethanol (Flush-09 to Flush-12), are not stable.

The Flushing solution, which contains 100 wt % 2-phenoxy ethanol, has a viscosity higher than 20 mPas·s (25° C. at a shear rate of 1000 $s^{-1}$). Such a high viscosity may, depending on the printheads and printer systems, result in difficulties when introducing and flowing such high viscous liquid through the printer tubings and printhead, for instance before loading the Ag inkjet ink into the system or during a cleaning process.

The best results, combining a low viscosity and a high stability are obtained with Flush-01, comprising at least 25 wt % of 2-phenoxy ethanol and from 5 wt % to 20 wt % of butanol, all based on the total weight of the Flushing liquid. Thus, when loading the Ag inkjet ink into the printing system or during a cleaning process, no sedimentation of Ag nanoparticles will occur inside the printhead or printing system which will increase the lifetime of the printhead and also allows for a better jetting performance of the Ag inkjet ink.

The invention claimed is:

1. An inkjet ink set comprising:
   a silver inkjet ink; and
   a flushing liquid; wherein
   the flushing liquid includes at least 25 wt % of 2-phenoxy ethanol based on a total weight of the flushing liquid, and wherein
   the silver inkjet ink includes silver nanoparticles, a liquid carrier, and a non-polymeric dispersion-stabilizing compound according to Formula I, II, III, or IV:

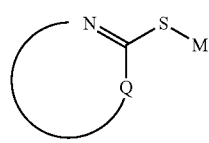

Formula I

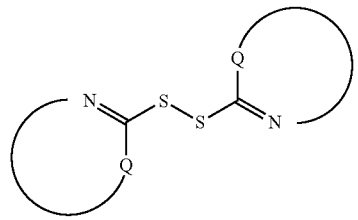

Formula II

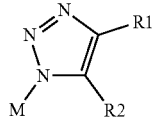

Formula III

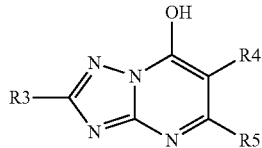

Formula IV wherein

Q represents atoms necessary to form a substituted or unsubstituted five or six membered heteroaromatic ring;

M is selected from the group consisting of a hydrogen, a monovalent cationic group, and an acyl group;

R1 and R2 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group, a hydroxyl group, a thioether, an ether, an ester, an amide, an amine, a halogen, a ketone, and an aldehyde;

R1 and R2 may represent atoms necessary to form a five to seven membered ring;

R3 to R5 are independently selected from the group consisting of a hydrogen, a substituted or unsubstituted alkyl group, a substituted or unsubstituted alkenyl group, a substituted or unsubstituted alkynyl group, a substituted or unsubstituted alkaryl group, a substituted or unsubstituted aralkyl group, a substituted or unsubstituted aryl or heteroaryl group, a hydroxyl group, a thiol, a thioether, a sulfone, a sulfoxide, an ether, an ester, an amide, an amine, a halogen, a ketone, an aldehyde, a nitrile, and a nitro group;

R4 and R5 may represent atoms necessary to form a five to seven membered ring.

2. The inkjet ink set according to claim 1, wherein the silver inkjet ink includes the non-polymeric dispersion-stabilizing compound according to Formula I, and Q represents the atoms necessary to form a five membered heteroaromatic ring.

3. The inkjet ink set according to claim 2, wherein the five membered heteroaromatic ring is selected from the group consisting of an imidazole, a benzimidazole, a thiazole, a benzothiazole, an oxazole, a benzoxazole, a 1,2,3-triazole, a 1,2,4-triazole, an oxadiazole, a thiadiazole, and a tetrazole.

4. The inkjet ink set according to claim 1, wherein the non-polymeric dispersion-stabilizing compound is selected from the group consisting of N, N-dibutyl-(2,5-dihydro-5-thioxo-1H-tetrazol-1-yl-acetamide, 5-hepty1-2-mercapto-1,3,4-oxadiazole, 1-phenyl-5-mercaptotetrazol, 5-methyl-1,2,4-triazolo-(1,5-a) primidine-7-ol, and S[5-[(ethoxycarbonyl)amino]-1,3,4-thiadiazol-2-yl] 0 -ethyl thiocarbonate.

5. The inkjet ink set according to claim 1, wherein an amount of the non-polymeric dispersion-stabilizing compound expressed as wt % relative to a total weight of silver in the silver inkjet ink is between 0.005 and 10.0.

6. The inkjet ink set according to claim 1, wherein the liquid carrier is a high boiling solvent selected from the group consisting of 2-phenoxy ethanol, 4-methyl-1,3-dioxolan-2-one, n-butanol, 1,2 propanediol, 4-hydroxy-4-methyl pentan-2-one, pentan-3-one, 2-butoxy-ethanol, 1-methoxy-2-propanol and mixtures thereof.

7. The inkjet ink set according to claim 1, wherein the liquid carrier includes at least 25 wt % of 2-phenoxyethanol and between 5 and 20 wt % of n-butanol.

* * * * *